United States Patent [19]

Adam et al.

[11] Patent Number: 5,586,783
[45] Date of Patent: Dec. 24, 1996

[54] HYBRID GAS GENERATOR FOR FILLING A GAS BAG

[75] Inventors: Paul Adam, Munich; Heinz Tillmann, deceased, late of Riemerling, by Zita M. Tillmann, executor; Michael Werner, Höhenkirchen-Siegertsbrunn; Peter Renn, Taufkirchen; Joachim Reif, Sauerlach; Uwe Dölling, Heldenstein, all of Germany

[73] Assignee: TEMIC Bayern-Chemie Airbag GmbH, Aschau/Inn, Germany

[21] Appl. No.: 393,361

[22] Filed: Feb. 23, 1995

[30] Foreign Application Priority Data

Feb. 24, 1994 [DE] Germany .......................... 44 05 997.3

[51] Int. Cl.⁶ .................................................. B60R 21/26
[52] U.S. Cl. ......................... 280/737; 222/3; 137/68.13; 137/74
[58] Field of Search .................. 280/737, 736, 280/740, 741; 222/3; 137/68.2, 68.12, 68.13, 68.19, 68.28, 74, 72

[56] References Cited

U.S. PATENT DOCUMENTS

| Re. 32,584 | 1/1988 | Pietz | 280/741 |
|---|---|---|---|
| 3,723,205 | 3/1973 | Scheffee | 280/741 |
| 3,785,149 | 1/1974 | Timmerman | 280/741 |
| 3,971,729 | 7/1976 | Timmerman | 280/741 |
| 4,131,300 | 12/1978 | Radke et al. | 280/737 |
| 5,022,674 | 6/1991 | Frantom et al. | 280/737 |
| 5,033,772 | 7/1991 | Frantom et al. | 280/737 |
| 5,076,607 | 12/1991 | Woods et al. | 280/737 |
| 5,290,060 | 3/1994 | Smith | 280/737 |
| 5,378,015 | 1/1995 | Rink et al. | 280/736 |

FOREIGN PATENT DOCUMENTS

| 0445474 | 9/1991 | European Pat. Off. . |
|---|---|---|
| 0559335 | 9/1993 | European Pat. Off. . |

Primary Examiner—Brian L. Johnson
Assistant Examiner—Peter C. English
Attorney, Agent, or Firm—Spencer & Frank

[57] ABSTRACT

A hybrid gas generator includes a pyrotechnic gas generator joined to a high-pressure vessel which is sealed with a sealing disk composed of a substance which chemically reacts with propellant gas produced in use so that the sealing disk is opened with an advantageously reduced acoustic pressure. The propellant gas is chemically reactive and is produced from a propellant composition which is present in a surplus amount and which is composed of a propellant which is oxidizable and at least one oxidant for oxidizing the propellant. The propellant gas attacks the sealing disk chemically and thermally, and continuously burns through it to release the gas from the high-pressure vessel into a mixing chamber in the pyrotechnic gas generator.

16 Claims, 1 Drawing Sheet

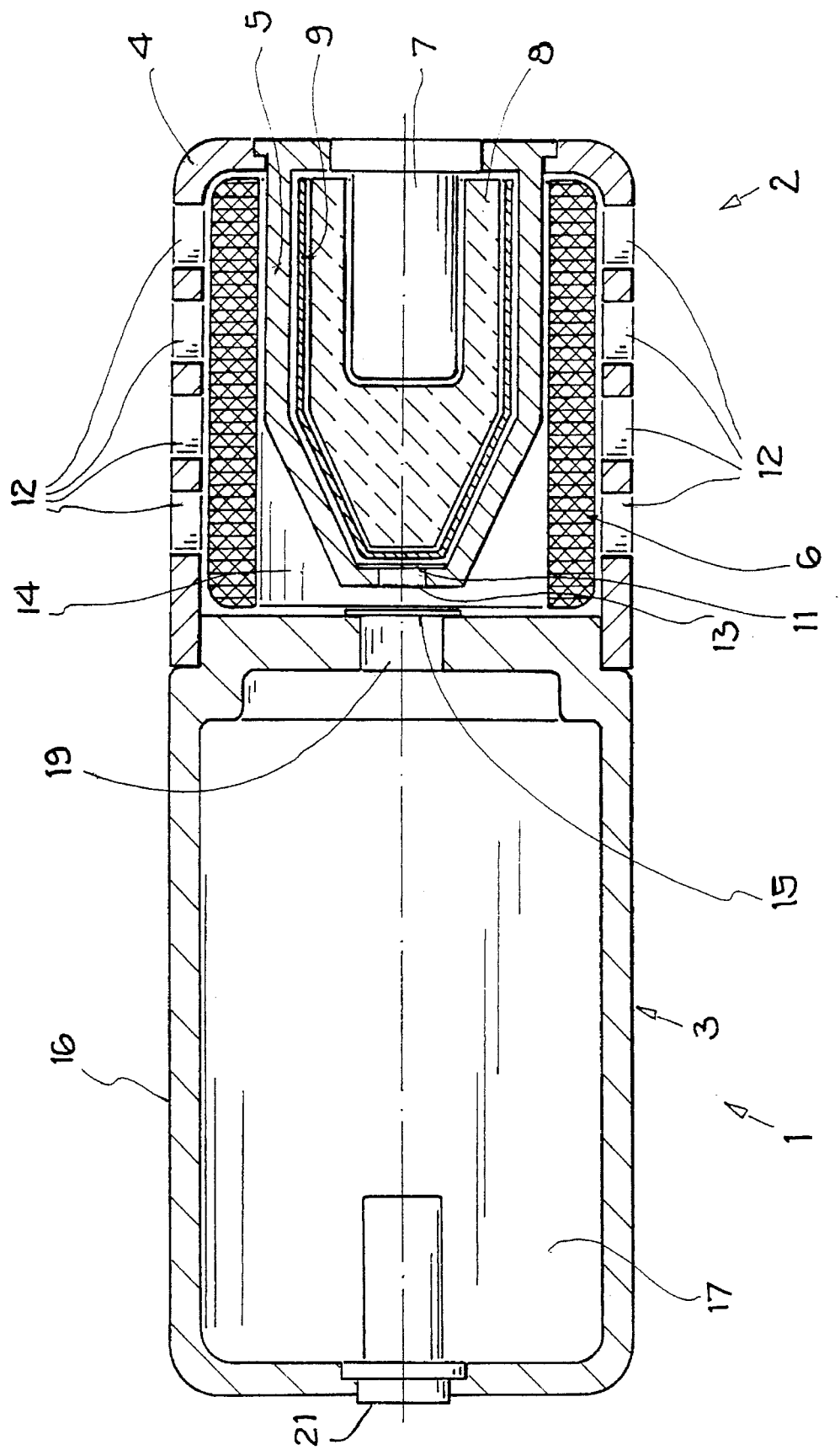

HYBRID GAS GENERATOR FOR FILLING A GAS BAG

BACKGROUND OF THE INVENTION

1. Field of the Invention

The invention relates to a hybrid gas generator with a pyrotechnic gas generator and a high-pressure vessel where, after having ignited a propellant substance, propellant gases flow out from an opening in a combustion chamber and blow against a sealing disk situated on the high-pressure vessel and opposite the opening and after the sealing disk opens the propellant gases and gas from the high-pressure vessel flow through escape openings into a gas bag.

2. Description of the Related Art

A hybrid gas generator of this kind is known from the U.S. Pat. No. 5,022,674 which describes the opening of the sealing disk for the high-pressure vessel with a shock wave that produces a high pressure. Experiments have shown that the resulting acoustic pressure would have been capable of causing permanent hearing damage to approximately 25% of all persons.

The object of the invention is to provide, in a hybrid gas generator of the type named at the outset, for the sealing disk that closes the high-pressure vessel to open without the occurrence of a high acoustic pressure.

SUMMARY OF THE INVENTION

According to the invention there is provided a composition for the propellant substance with a surplus of substances for generating a chemically reactive propellant gas which attacks the surface of the sealing disk chemically and thermally and continuously burns through.

The main advantage of the invention is that, because of the propellant gas composition used, the sealing disk closing the high-pressure vessel burns through continuously as in a welding process. This results in the sealing disk opening without a bang taking place. The propellant substance used is not in stoichiometric equilibrium in the burning reaction, but instead it has a surplus of oxidizing substances. This means that the propellant substance is overbalanced with oxidant. The burning process of the sealing disk generates a mass flow of the gases from the high-pressure vessel over a specific period of time. Because the sealing disk is joined to the high-pressure vessel, advantageously by a welding process such as laser welding or electron beam welding, it must also be made of steel foil or light-metal sheet depending on whether the high-pressure vessel is made of steel or light metal. In a further development of the invention, a component is arranged in the hybrid gas vessel between a mixing space for the propellant gas and the gas from the high-pressure vessel and the outlet openings for the gases that cleans and tempers the gases, dampens the sound and acts as catalyst for reducing the proportion of undesired gases. The gas generator according to the invention is of simple design and suitable for automatic production in large quantities.

BRIEF DESCRIPTION OF THE DRAWINGS

The invention is described below in more detail with reference to the drawing. The single figure shows a simplified cross-section through a hybrid gas generator.

DESCRIPTION OF THE PREFERRED EMBODIMENTS

A hybrid gas generator 1 consists of two units rigidly connected together. The one is a pyrotechnic gas generator 2 and the other is a high-pressure vessel 3. The pyrotechnic gas generator 2 consists of an enveloping housing 4 containing a combustion chamber 5 and a component 6. The combustion chamber 5 contains an igniter 7, a solid composition 8, elements 9 for fixing the propellant substance 8, and a dam 11. The component 6, made of grating, meshing or felt and produced from a suitable material such as metal or ceramics, can act as a filter for separating condensed particles in the gas stream, as a temperature compensator, for sound damping and as a catalyst for reducing the proportion of undesired gases. The enveloping housing 4 has outlet openings 12 and in the combustion chamber 5 there is a blow-out opening 13 for propellant gases. Between component 6, combustion chamber 5 and the high-pressure vessel 3 there is a mixing space 14. The high-pressure vessel 3 has a bottle-shaped housing 16 containing the majority of a non-toxic and environment-friendly gas 17 for inflating a gas bag that is not illustrated here. Opposite the blow-out opening 13 of the combustion chamber 5 there is a sealing disk 15 in front of outflow opening 19. Finally, there is a pressure measuring device 21 at the rear end of the high-pressure vessel 3. The high-pressure vessel 3 is made of steel or light metal and the sealing disk 15 that is put into place by laser welding is accordingly made of steel foil or of light-metal sheet.

The mode of functioning of the hybrid gas generator 1 is described below. The propellant 8 in the combustion chamber 5 is ignited pyrotechnically by means of the igniter 7. When the propellant 8 burns, a hot propellant gas is generated and a pressure builds up in the combustion chamber 5. The propellant gas composition with overbalanced oxidant generates through the combustion a chemically reactive gas that can act like a welding torch flame. Until a stable burning process has become established in the combustion chamber 5, the dam 11 keeps the combustion chamber 5 closed. If the pressure is sufficiently great, the dam 11 bursts open and allows the hot propellant gases from the combustion chamber 5 to escape through the opening 13 and impinge on the sealing disk 15 of the high-pressure vessel 3. The sealing disk 15 is so designed that different mass flow curves through the outflow opening 19 can be set. For setting an initially high chamber pressure gradient, the sealing disk 15 is designed with a thin cross-section provided by notches. However, for setting an initially low pressure gradient the sealing disk 15 is reinforced at the center or weakened at the edges. The sealing disk 15 designed specially for the specific application is first of all burnt open when the hot chemical aggressive propellant gases encounter it and can then continue to burn through according to its physical shape and thus free the outflow opening 19. The time required for the sealing disk 15 to burn through can be set by suitably selecting the propellant gas composition 8 in terms of burning velocity, energy and oxidant content as well as by the geometrical dimensions and shape of the blow-out opening 13, the outflow opening 19, the dam 11 and (as already described above) the sealing disk 15. Furthermore, specifically required times for the opening process and the necessary mass flows of the propellant gases and the high-pressure gas 17 into the gas bag to be filled can be determined by the spaces between and the arrangement of the above-mentioned components.

In the mixing space 14, the propellant gases from the combustion chamber 5 now mix with the cold gases from the high-pressure vessel 3. Condensed products of combustion of the propellant gases (solid and liquid) move through the blow-out opening 13 and because of their inertia further through the outlet opening 19 into the housing 16 of the high-pressure vessel 3 where they deposit on the cold wall. If condensed products are not created before the mixing space 14, these can be retained by the filter action of component 6. Component 6 can also serve to catalytically convert undesired components of the mixed gas and to obtain temperature compensation over the period of action of the hybrid gas generator 1 or to dampen the sound that is created inside the generator. The generated gas mixture finally leaves the mixing space 14 through the outlet openings 12 and is available for filling the gas bag. During the entire life and period of application of the hybrid gas generator 1, the pressure measuring device 21, equipped with temperature compensation, monitors the pressure in the high-pressure vessel 3 and signals an unforeseen pressure drop.

What is claimed is:

1. A hybrid gas generator, comprising:
   a. a pyrotechnic gas generator which is comprised of:
      a enveloping housing which is provided with a plurality of outlet openings;
      an igniter which is positioned within the enveloping housing;
      a mixing chamber which is provided within the enveloping housing and which is in communication with the plurality of outlet openings; and
      a combustion chamber which is provided within the enveloping housing in communication with the igniter, which has defined therein a blow-out opening in communication with the mixing chamber, and which contains a propellant composition comprised of a propellant which is oxidizable and an amount in excess of a stoichiometric amount of at least one oxidant for oxidizing the propellant in use to generate a propellant gas which is chemically reactive by igniting the propellant composition with the igniter; and
   b. a high-pressure vessel which is comprised of:
      a housing which contains gas under pressure;
      an outflow opening which is defined in the high-pressure vessel and at which the high-pressure vessel is joined to the pyrotechnic gas generator; and
      a sealing disk which is sealingly joined to the housing and positioned between the outflow opening of the high-pressure vessel and the mixing chamber of the pyrotechnic gas generator opposite the blow-out opening of the combustion chamber so that the propellant gas produced in the combustion chamber in use impinges against the sealing disk, and which is comprised of a substance which chemically reacts with the propellant gas so that the propellant gas attacks the sealing disk chemically and thermally, and continuously burns through the sealing disk as in a welding process in use whereby the sealing disk opens with a substantially reduced acoustic pressure and without a bang, the gas from the high-pressure vessel flows into the mixing chamber, mixes with the propellant gas to provide a gas mixture, and the gas mixture flows through the plurality of outlet openings provided in the enveloping housing of the pyrotechnic gas generator into a gas bag.

2. The hybrid gas generator in accordance with claim 1, wherein the propellant composition comprises an amount of the at least one oxidant in excess of that required to oxidize the propellant.

3. The hybrid gas generator in accordance with claim 2, wherein the sealing disk is comprised of a substance which is easily combusted by the propellant gas.

4. The hybrid gas generator in accordance with claim 3, wherein the substance which is easily combusted by the propellant gas is selected from the group consisting of a steel foil and a light metal sheet.

5. The hybrid gas generator in accordance with claim 4, wherein the sealing disk has a structure such that the burning of the sealing disk generates a mass flow of the gas from the high-pressure vessel over a specific period of time.

6. The hybrid gas generator in accordance with claim 5, wherein the sealing disk is sealingly joined to the housing of the high-pressure vessel by a weld.

7. The hybrid gas generator in accordance with claim 6, wherein the sealing disk is sealingly joined to the housing of the high-pressure vessel in a gas tight manner, and wherein the weld is one of a laser weld or an electron-beam weld.

8. The hybrid gas generator in accordance with claim 7, further comprising a component which is positioned between the mixing chamber and the plurality of outlet openings which cleans and tempers the mixture of gases, which dampens sound produced, and which acts as a catalyst for reducing amounts of undesired gases.

9. The hybrid gas generator in accordance with claim 8, wherein the component is comprised of a material selected from the group consisting of a metal and a ceramic.

10. The hybrid gas generator in accordance with claim 9, wherein the component has a form selected from the group consisting of a grating, a mesh, and a felt.

11. The hybrid gas generator in accordance with claim 1, further comprising a component which is positioned between the mixing chamber and the plurality of outlet openings which cleans and tempers the mixture of gases, which dampens sound produced, and which acts as a catalyst for reducing amounts of undesired gases.

12. The hybrid gas generator in accordance with claim 11, wherein the component is comprised of a material selected from the group consisting of a metal and a ceramic.

13. The hybrid gas generator in accordance with claim 12, wherein the component has a form selected from the group consisting of a grating, a mesh, and a felt.

14. The hybrid gas generator in accordance with claim 1, further comprising a dam provided at the blow-out opening of the combustion chamber to keep the combustion chamber closed prior to use during which the production of hot propellant gas causes the dam to burst open and allows the propellant gas to escape from the combustion chamber through the blow-out opening into the mixing chamber.

15. The hybrid gas generator in accordance with claim 1, further comprising a pressure measuring device provided in the high-pressure vessel remote from the outflow opening.

16. In a hybrid gas generator comprised of:
   a pyrotechnic gas generator which is comprised of a enveloping housing which is provided with a plurality of outlet openings; an igniter which is positioned within the enveloping housing; a mixing chamber which is defined within the enveloping housing and which is in communication with the plurality of outlet openings; and a combustion chamber which is provided within the enveloping housing in communication with the igniter, which has defined therein a blow-out opening in communication with the mixing chamber, and which contains a propellant composition comprised of a propellant which is oxidizable and at least one oxidant for oxidizing the propellant in use to generate a propellant gas by igniting the propellant composition with the igniter; and
   a high-pressure vessel which is comprised of a housing which contains gas under pressure; an outflow opening which is defined in the high-pressure vessel and at which the high-pressure vessel is joined to the pyrotechnic gas generator; and a sealing disk which is sealingly joined to the housing and positioned between the outflow opening of the high-pressure vessel and the mixing chamber of the pyrotechnic gas generator opposite the blow-out opening of the combustion chamber so that the propellant gas produced in the combustion chamber in use impinges against the sealing disk in use whereby the gas from the high-pressure vessel flows into the mixing chamber, mixes with the propellant gas to provide a gas mixture, and the gas mixture flows through the plurality of outlet openings provided in the enveloping housing of the pyrotechnic gas generator into a gas bag, the improvement in which:

the propellant composition contains an amount in excess of a stoichiometric amount of the at least one oxidant for oxidizing the propellant in use and generates in use propellant gas which is chemically reactive; and the sealing disk is comprised of a substance which chemically reacts with the propellant gas so that the propellant gas attacks the sealing disk chemically and thermally, and continuously burns through the sealing disk as in a welding process in use whereby the sealing disk is opened with a substantially reduced acoustic pressure and without a bang.

\* \* \* \* \*